Dec. 28, 1954   J. DI PALMA   2,698,150
CABLE GRIP

Filed June 8, 1951   2 Sheets-Sheet 1

INVENTOR.
JOSEPH DI PALMA
BY J. A. Grier
ATTORNEY

Dec. 28, 1954  J. DI PALMA  2,698,150
CABLE GRIP

Filed June 8, 1951  2 Sheets-Sheet 2

INVENTOR.
JOSEPH DI PALMA
BY *J. A. Grier*
ATTORNEY

United States Patent Office 2,698,150
Patented Dec. 28, 1954

2,698,150

CABLE GRIP

Joseph Di Palma, Westport, Conn.

Application June 8, 1951, Serial No. 230,589

6 Claims. (Cl. 248—63)

This invention relates to improvements in cable grips and is directed more particularly to strain relieving cable grips and the method of making the same.

Another object of the invention is the provision of a cable grip having means to secure one end of it to a support, said means being comprised of a plurality of tubular members each having two adjacent ends of the wires, from which the grip is woven, secured therein, and thereafter formed to hookedly engage a ferrule.

A further object of the invention is the provision of a cable grip having the formed tubular member hook shaped and engaging a ferrule in which the flange engaged thereby is disposed at an angle of between 44 and 62 degrees with respect to a central axis therethrough.

Yet another object of the invention is the provision, in a strain relieving cable grip, wherein tubular members, such as those referred to above, are hook shaped to engage a flange which is disposed about 90° with respect to the axis of the ferrule.

Another object of the invention is the provision, in a strain relieving cable grip, of a head comprised of a plurality of hooks on the extremity of said grip engaging and soldered, welded or otherwise secured to the angular flange annularly disposed about and integral with a ferrule, thereby forming a unitary head.

A further object of the invention is the provision of a support for strain relieving cable grips comprised of an annular ring having upturned ears formed integral therewith and having holes in said ears in which a U-shaped extension or bail is swiveled, so that when the end of a cable grip of the strain relieving type is engaged with the center hole in the annulus and the bail is connected to a hook or other device, an ideal support obtains.

Other objects and advantages of the invention will be apparent to those skilled in the art, upon a study of this specification and the accompanying drawings.

Referring to the drawings, which include one embodiment and a modification thereof:

Figure 1:
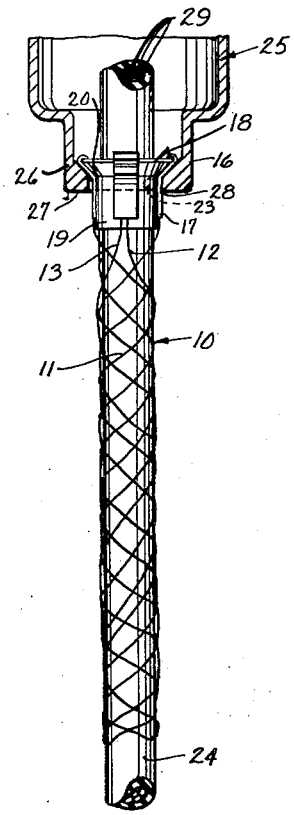
Figure 1 is an elevational view showing a cable supported by one of my strain relieving grips which is engaged with a stepped hollow support.

Referring first to Figures 1 to 5, my new and improved strain relieving grip 10 is comprised of a woven body 11, which may be woven by any of the known methods. As the body was woven the pairs of end wires 12 and 13 extend from one end thereof. Each pair 12 and 13 are extended into the central passage in a tube member 14, and each tube member is pinched at 15 to retain it on its pair of wires.

Figure 3:
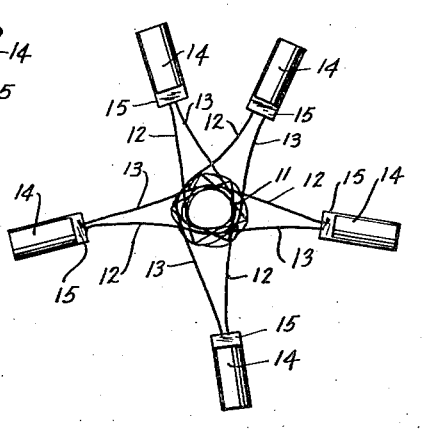
Figure 3 is a plan view of the grip of Figure 2 with the lower end uppermost and with the tubular members horizontally disposed due to downward pressure on the grip.
Figure 4:
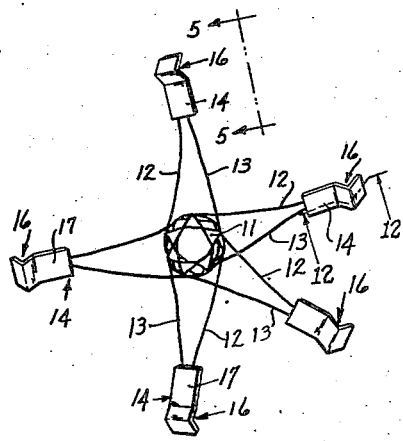
Figure 4 is a view similar to Figure 3, after the tubular members have been deformed by dies to form hooks to engage a ferrule.
Figure 12:
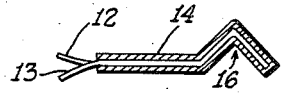
Figure 12 is an enlarged cross-sectional elevation taken along the line 12—12 of Figure 4.
Figure 5:
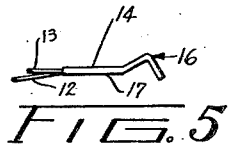
Figure 5 is a view taken along the line 5—5 of Figure 4.

Referring now to Figure 3, the grip 11 is inverted with the tube members 14 lying flat on a surface and extending radially from the axis of the woven portion. The surface has forming cavities therein (not shown) and constitutes one member or half of a forming die. A plunger or ram portion (also not shown) cooperates with the other half to form the tube members 14, by flattening them and forming the end of each into the form of a hook 16. A cross-sectional elevation of the tube member 14 when so formed is shown in Figure 12 and in that figure, it will be noted that the malleable metal of which the hooks are formed surrounds and thoroughly embeds the strands 12 and 13 therein, thereby forming a substantially strong and substantially permanent union of the strands and the hook. The flat portion 17 lies between the hook 16 and the end wires 12, 13.

Figure 6:
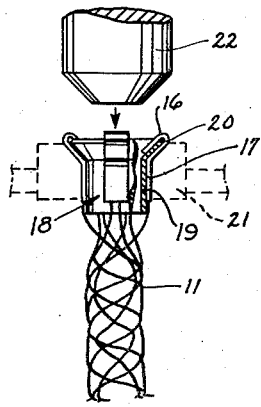
Figure 6 is a view showing a tapered plunger to force the hooks into intimate engagement with the angular flange on the ferrule.

In Figure 6, a ferrule 18 which includes a tubular portion 19 and a flared portion 20 is engaged in a unique manner. The flared portion in this instance is 45° with respect to the axis of the ferrule. However, I propose to use other angles than 45 degrees as will be hereinafter explained in detail. The hook portions 16 overhang and engage the flare 20, which the flat portions 17 lie along the outer surface of the tubular portion 19 of the ferrule. The ferrule, and the five hook members engaging it, is placed in a conforming cavity in a fixture 21, as shown in Figure 6, and a punch or plunger 22 moving in the direction of the arrow, completes the forming of all of the hooks so that they intimately engage the flared portion of the ferrule, thereby completing the cable grip for some classes of use. For other classes of use, the ferrule end of the grip is soldered, preferably by dipping the same into molten solder.

One method of using this cable grip is shown in Figure 1, wherein the cable grip assembly 10 is placed on a cable 24 by pushing the ends of the woven portion 11 toward each other to increase the internal diameter thereof so as to accommodate the cable. After it is placed on the cable, the ends of the woven portion 11 are pushed in the opposite direction to cause the latter to snugly engage the cable.

A stepped tubular fixture 25 has several steps, the smallest 26 of which terminates on an inwardly turned flange 27, the hole 28 therein clearing the outer diameter of the ferrule and the flat portions 17 of the hook members. An internal pin 23 projects sufficiently to extend between one flat portion and its neighbor to prevent the grip from rotating in the hole 28.

Suppose the fixture 25 were supported on an instrument in which individual wires 29 form loops between the upper end of the cable 24 and terminals of said instrument, and suppose that the lower end of the cable extends a sufficient length to have weight and exert substantial pull on such terminals, were the grip not present. The weight or pull exerted by the cable causes the woven body of the grip to tightly engage the cable and prevent the cable from slipping in the grip and allowing said weight or pull from being exerted upon said loops and the terminals.

Figure 7:
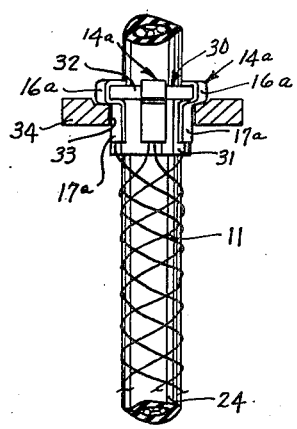
Figure 7 is a view of a modification of the invention wherein the ferrule has a flange which lies on a plane 90° with respect to the axis of the grip and or the ferrule.

I show in Figure 7 a modification wherein a ferrule 30 has a tubular portion 31 and a flared portion 32. In this form of the invention, the flared portion extends 90° with respect to the axis of the tubular portion. The tubular members 14 are placed on the pairs of wires 12, 13 extending from the woven grip 11 and are initially flattened as at 15 in Figure 2, to retain the wires 12, 13 therein, following which they are entirely flattened and formed with straight portions 17a and hook portions 16a. The hook portions, in this modification, engage the lower surface of the flared portion, 32, the periphery of the flared portion, and the upper surface of the flared portion; while the straight portions 17a contact the outer surface of this tubular portion 31. They are made to conform to and intimately engage said surfaces in a manner similar to that shown in Figure 6, except that 90° angles are involved instead of 45° angles, and after forming, they may or may not be soldered. This depends upon the service requirements.

Figure 10:
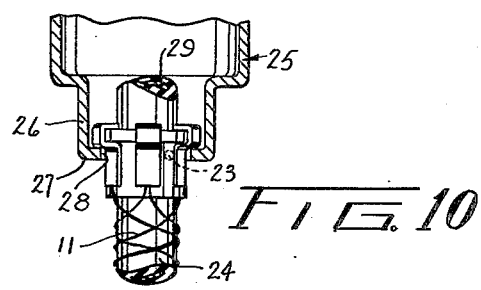
Figure 10 is a fragmentary view showing the 90° flanged ferrule engaged with its hooks and engaged with a support such as the support 25 shown in Figure 1.

The woven portion 11 of the grip may be expanded and placed on the cable 24, Figure 7, following which the ends of the woven portion are moved in opposite directions to contract said portion. After this, the cable, with the grip thereon is passed through a hole 33 formed in a support disc 34. The cable with this grip applied thereto, may be readily applied to a support 25, as may be clearly seen in Figure 10, just as the first form described herein was applied in Figure 1. The key pin 23 is positioned between any two adjacent hooks 16a, so that its rotation in the support 25 is thereby limited.

Figure 8:
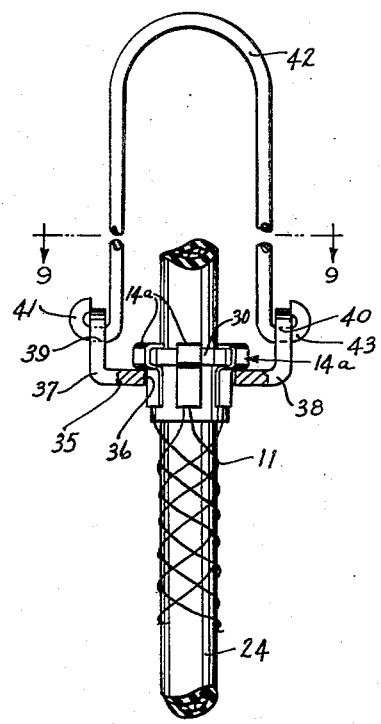
Figure 8 is a view similar to Figure 7 wherein the support is comprised of an annular ring having ears formed integral therewith and aligned holes through the latter and engaged by a U-shaped extension or bail.
Figure 9:
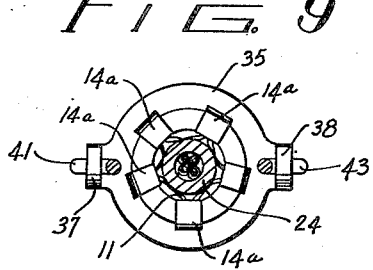
Figure 9 is a plan view taken along the line 9—9 of Figure 8.

Figure 8 is an elevation, partly in section, showing a disc like body 35 having a hole 36 therethrough and having oppositely disposed up-turned lugs 37 and 38 formed integral therewith. The lugs 37 and 38 have aligned holes therethrough, and extending through said holes are the hooked ends 4, 43 of a U-shaped bail 42. Now when a cable grip, of either of the two forms disclosed herein, is placed on a cable, such as the cable 24 and is to be supported in the manner shown in Figure 8, the bail 42 may be engaged with a hook or other suitable element for supporting the cable. This provides a swiveled arrangement, which may be used for cable "cut ins," and in practically any instance where strain relieving features are necessary. A plan view of this arrangement taken along the line 9—9 of Figure 8, shows the simplicity and effectiveness of the arrangement.

Figure 2:
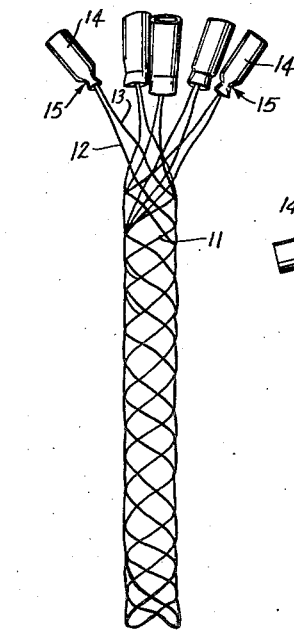
Figure 2 is a view showing the grip of Figure 1, just after it was woven, and having tubular members each engaging a pair of adjacent wires extending from the woven body and staked to retain said wires therein.
Figure 11:
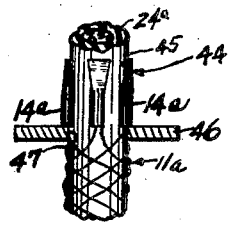
Figure 11 is a view of a further modification of the invention.

Referring now to Figure 11, a modification is shown wherein sleeves 14a are applied to the pairs of ends of the wires forming the woven cable grip. However, instead of flattening the sleeves 14a at the point 15 as shown in Figure 2, the upper ends are flattened as for example at 44 and on the opposite face 45. This leaves the full diameter of the sleeve 14a at the bottom so that when the device is placed on a cable 24a, and a washer or ring 46 is placed over the woven body 11a, and presents a shoulder against which the lower ends of all the tubular members 14a rest. Since the pairs of cables are solidly secured in each little tube by the flattening at 44 and 45, the load of the cable 24a on the grip is distributed onto the ring or washer 46 via the several sleeve members 14a and thereby a neat, simple, and strong support is provided for this simple form of this supporting grip.

Although I have shown by way of example, one embodiment of the invention and several modifications of the same, it is obvious that many changes may be made in the arrangements, shown and described, within the scope of the following claims.

I claim:

1. In a strain relieving cable grip, in combination, an open mesh woven wire tube having a draft end comprising, extension strands of said tube being divided into a plurality of groups, a plurality of hollow sleeves, each embracing a different one of said groups, said sleeves each being flattened to retain it on its group, the free end of each flattened sleeve being bent in the form of a hook, leaving the remainder thereof adjacent to said hook as a straight shank portion, a tubular ferrule having one end flared outwardly and engaged by all said hooks and having its tubular portion extending into said draft end and contacted by said shank portions, and a support having a socket therein engaged by said draft end.

2. A strain relieving cable grip according to claim 1, in which both said hooks and said shank portions of said sleeves are positively secured to said ferrule.

3. In a strain relieving cable grip, in combination, an open mesh woven wire tube having a draft end comprising, extension strands of said tube divided into a plurality of groups, a plurality of hollow sleeves, each embracing a different one of said groups, said sleeves each being flattened to retain it on its group, the free end of each flattened sleeve being bent in the form of a hook and the remaining portion comprising a shank, a tubular ferrule having a portion at one end thereof flared outwardly, said flared portion being engaged by all of said hooks, and the tubular portion contacted by said shank portions and extending into said mesh woven wire tube, and a support having a hole therein to accommodate said tubular portion and said shank portions in contact therewith and having an annular ledge upon which the flared portion and said hooks bear.

4. In a strain relieving cable grip, in combination, an open mesh woven wire tube having a draft end comprising, extension strands of said tube divided into a plurality of groups of pairs, a plurality of hollow sleeves, each embracing a different one of said pairs, said sleeves each being flattened to retain its pair therein, the free end of each flattened tube being bent in the form of a hook and the remainder comprising a shank portion, a ferrule having a tubular body and an outwardly flared portion forming an angle of approximately 45° with respect to the axis of said body, said flared portion having all of said hooks secured to it about the outer periphery thereof, said tubular body being contacted by said shank portions, and a support having a hole therein receiving said tubular body and the shanks thereabout and having a ledge therein engaged by and secured to said flared portion and the hooks secured thereto.

5. In a strain relieving cable grip, a plurality of interwoven wire strands in the form of an expansible and contractible tube and having extension strands at one end thereof arranged in a series of groups each of which is bound together by being embedded in a tubular sleeve, each of said sleeves having its free end in the form of a hook and the remainder of its length comprising a shank, a tubular ferrule having an outwardly flared flange engaged by said hooks, said tube and said tubular ferrule being substantially in axial alignment, said ferrule with the hooks arrayed thereabout constituting a draft terminal of said grip, and a support having a socket therein to receive said draft terminal.

6. In a strain relieving cable grip, in combination, an open mesh woven wire tube having a draft end comprising, extension strands of said tube divided into a plurality of groups of pairs, a plurality of hollow sleeves, each embracing a different one of said pairs, said sleeves each being flattened to retain its pair therein, the free end of each flattened tube being bent in the form of a hook and the remainder comprising a shank portion, a ferrule having a tubular body and an outwardly flared portion forming an angle of approximately 90° with respect to the axis of said body, said flared portion having all of said hooks secured to it about the outer periphery thereof, said tubular body being contacted by said shank portions, and a support having a hole therein to accommodate said tubular portion and said shank portions in contact therewith and having an annular ledge upon which the flared portion and said hooks bear.

References Cited in the file of this patent

UNITED STATES PATENTS

| Number | Name | Date |
| --- | --- | --- |
| 656,187 | Gunnell | Aug. 21, 1900 |
| 1,686,250 | Page | Oct. 2, 1928 |
| 2,279,237 | Kellems | Apr. 7, 1942 |
| 2,315,082 | Roberts | Mar. 30, 1943 |
| 2,318,164 | Kellems | May 4, 1943 |
| 2,454,829 | Neijstrom | Nov. 30, 1948 |